United States Patent [19]
Bosses

[11] Patent Number: 5,464,460
[45] Date of Patent: Nov. 7, 1995

[54] DISPOSABLE DUST BAG FOR VACUUM CLEANER AND THE LIKE

[75] Inventor: Mark D. Bosses, Montvale, N.J.

[73] Assignee: Home Care Industries, Inc., Clifton, N.J.

[21] Appl. No.: 227,723

[22] Filed: Apr. 14, 1994

[51] Int. Cl.⁶ .............................. B01D 46/02; A47L 9/14
[52] U.S. Cl. ................ 55/374; 15/347; 55/378; 55/DIG. 2; 55/DIG. 3; 285/7
[58] Field of Search .......................... 55/DIG. 2, DIG. 3, 55/373, 374, 376, 378, 379; 15/347, 349, 352; 285/7

[56] References Cited

U.S. PATENT DOCUMENTS

| | | | |
|---|---|---|---|
| 2,945,558 | 7/1960 | Cordell | 55/DIG. 2 |
| 3,237,846 | 3/1966 | Brown | 55/DIG. 2 |
| 3,242,654 | 3/1966 | Koinstein | 55/376 |
| 3,392,906 | 7/1968 | Fesco | 55/DIG. 2 |
| 3,421,298 | 1/1969 | Downey | 55/378 |
| 3,432,997 | 3/1969 | Downey et al. | 285/7 |
| 3,432,998 | 3/1969 | Downey et al. | 285/7 |
| 3,724,179 | 4/1973 | Leinfelt | 285/7 |
| 3,933,451 | 1/1976 | Johansson | 55/376 |
| 4,274,847 | 6/1981 | Crener | 55/374 |
| 4,449,737 | 5/1984 | Specht | 285/7 |
| 4,877,432 | 10/1989 | Lackner | 55/375 |
| 5,039,324 | 8/1991 | Goldberg | 55/374 |
| 5,064,455 | 11/1991 | Lackner | 55/DIG. 2 |

Primary Examiner—Jay H. Woo
Assistant Examiner—Duane S. Smith
Attorney, Agent, or Firm—Amster, Rothstein & Ebenstein

[57] ABSTRACT

A disposable vacuum cleaner dust bag includes a porous sheet defining a dust collection chamber having an inlet, and a substantially rigid collar secured to the sheet around said inlet. The collar provides a generally circular opening and has at least a pair of peripherally spaced radially pivotable further portions disposed about the opening and extending radially inwardly further than the remainder of the collar when the pivotable portions and the collar remainder are in the same plane. An elastic diaphragm on the collar provides a generally circular opening smaller than the opening in the collar. The collar is adapted to mount on a connector having a generally cylindrical outlet having an end through which the air is delivered by a vacuum cleaner and which provides peripherally spaced outwardly extending projections. The collar is adapted to be installed, maintained in an installed position, and removed with the pivotable portions aligned with the projections. In the installed position the collar, the diaphragm and the pivotable portions are adapted to extend past the projections at the side thereof remote from the end, with the pivotal portions at least indirectly engaging the sides of the projections remote from the end at an angle to releasably secure the collar on the connector in the installed position. The diaphragm is adapted to extend into engagement with the surface of the connector on both sides of the projections to provide an airtight seal with the connector when the collar is in the installed position.

22 Claims, 4 Drawing Sheets

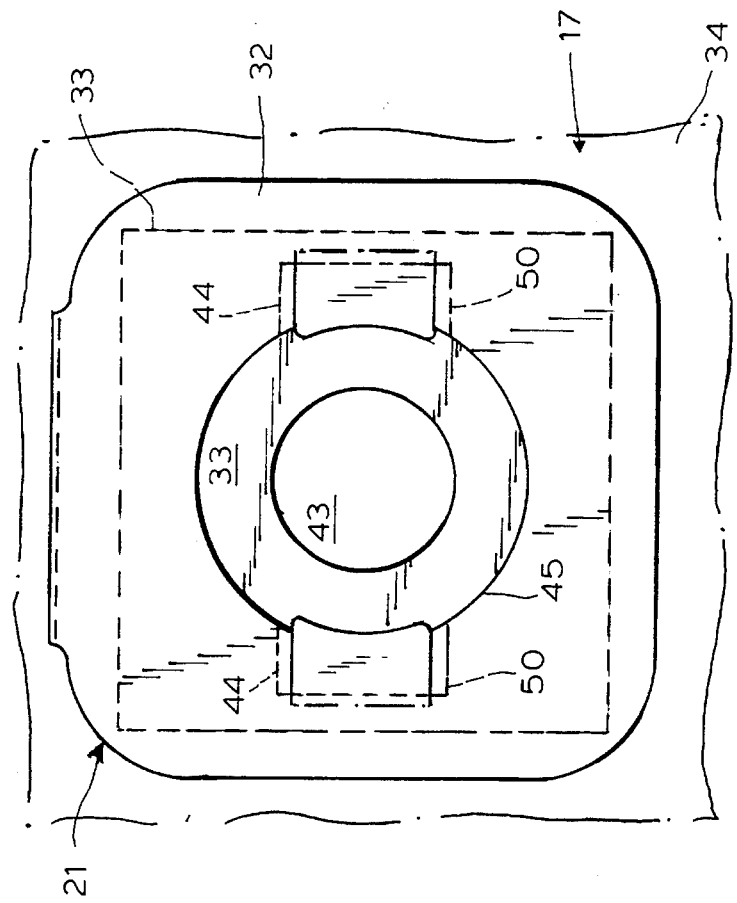
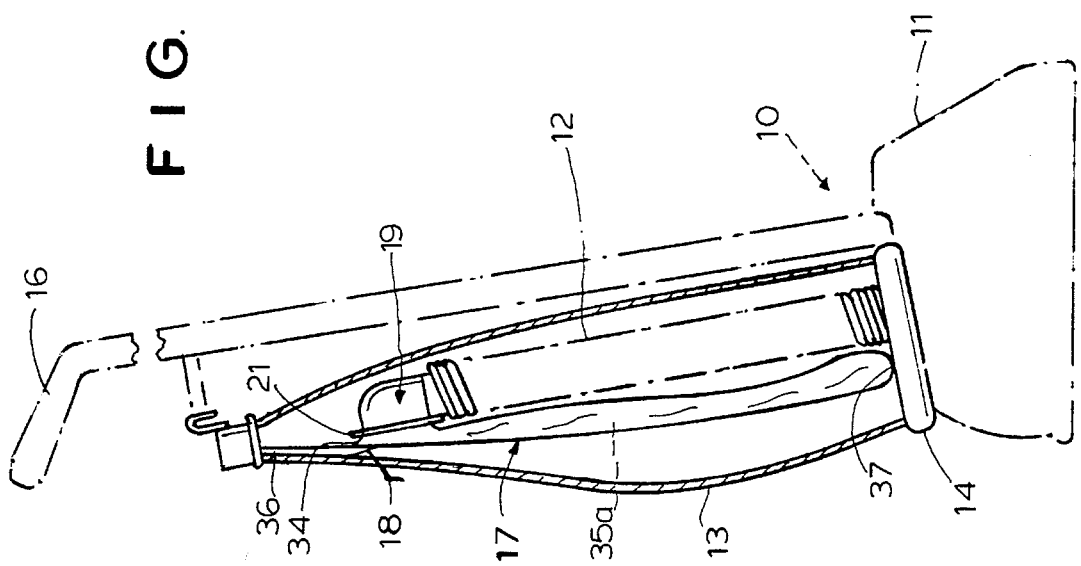

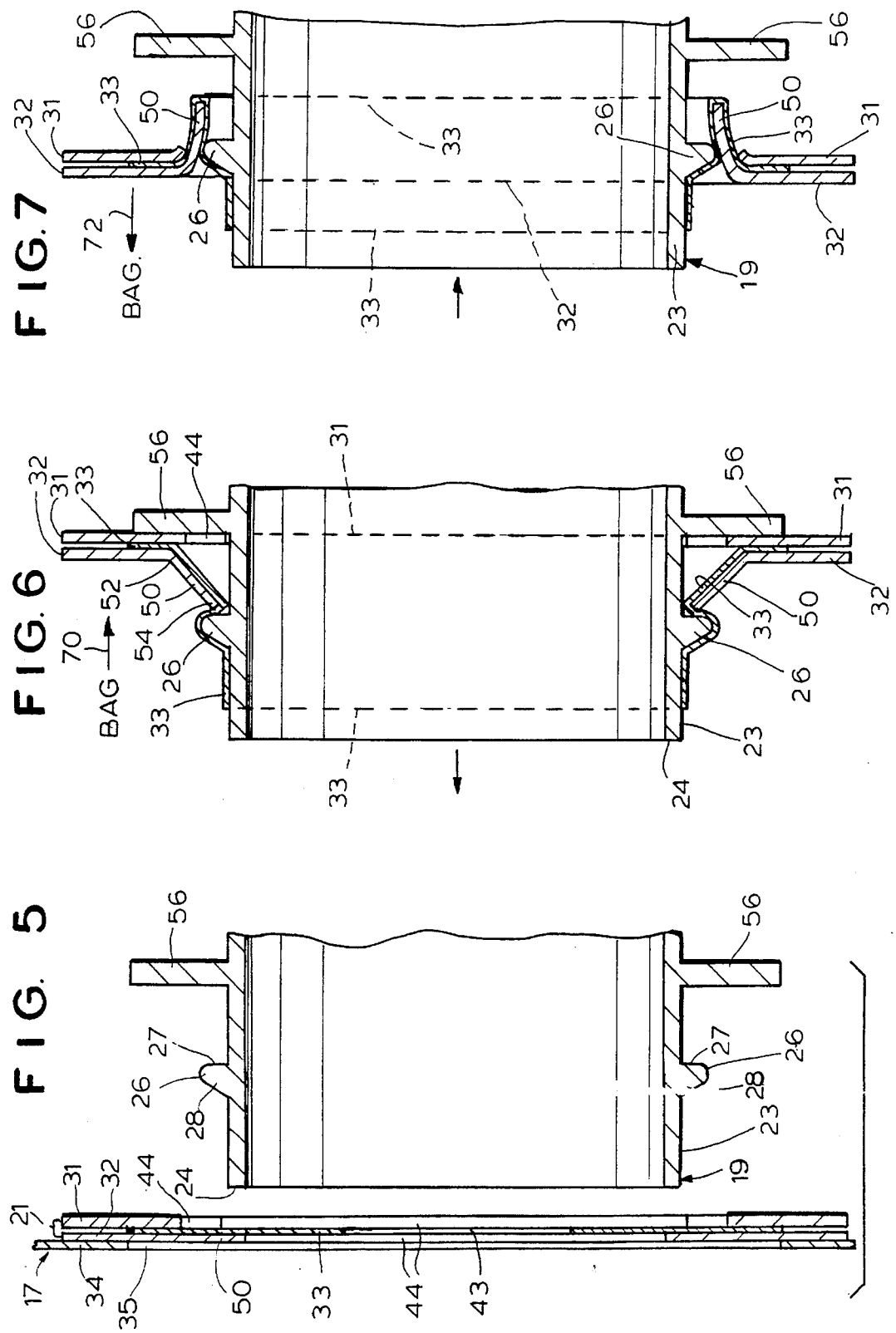

DISPOSABLE DUST BAG FOR VACUUM CLEANER AND THE LIKE

BACKGROUND OF THE INVENTION

This invention relates generally to suction or vacuum cleaners, and more particularly to a novel and improved mounting structure for removably mounting disposable dust bags on such a cleaner.

It is well known to provide disposable dust or filter bags for vacuum cleaners. Such bags are usually formed of a porous paper and define a chamber in which dust and dirt are collected. When such bags have been used, they are removed and the bag and the dirt contained therein are discarded.

Because such bags are only used once and are discarded when full of dirt and dust, they must be economical to produce and market. However, the bags must be sufficiently durable to permit them to be installed and removed without damage. They must also provide a connecting and sealing structure for connecting the bag to the air discharge of the cleaner (typically a connector such as a hose-coupling) which is easily installed and which provides a reliable seal so that all of the air enters the filter bag.

It is known to provide such disposable dust bags with an inlet including a substantially rigid collar, formed of cardboard or plastic, and an elastomeric diaphragm which engages and provides a seal with a connector of the cleaner.

An example of a disposable dust bag mounting system is illustrated in U.S. Pat. No. 4,274,847, which discloses a mounting structure providing a rigid cardboard or plastic collar and a plastic diaphragm secured to the body of the dust bag around the inlet opening therein. The collar is provided with an opening having an enlarged portion which is sized to pass over a rib which extends around the end of the vacuum cleaner connector. The collar opening also provides a portion of reduced size which fits behind the rib when the collar is shifted laterally to the mounted position. Because of the shifting movement required, the collar must be relatively large. Also, because the diaphragm tends to lock the collar in the mounted position, the removal of the bag after use can be difficult.

U.S. Pat. No. 4,877,432 describes a bag which is inserted onto the connector in a mounting and removal orientation and then rotated to a locked or mounted orientation. Thus, in each of the described structures, the mounting action must be followed by a separate rotational action in order to put the collar of the bag and the hose coupling of the cleaner in a locked or mounted installed position relative to one another. Both structures thus suffer from the absence of an automatic locking means which releasably secures both the collar and the connector together in a locked or mounted installed position simply by inserting one upon the other, without any separate subsequent locking action.

Accordingly, it is an object of the present invention to provide a disposable dust bag for a vacuum cleaner which is installed on, maintained on and removed from the connector without relative rotation of the connector or dust bag collar.

Another object is to provide such a dust bag with a collar which is automatically releasably locked in the installed position upon mounting on the connector, without any subsequent relative rotation or lateral movement of the dust bag collar relative to the connector.

A further object is to provide such a dust bag which is easily installed, provides a reliable seal, and is economical to produce and market.

It is also an object to provide a vacuum cleaner and a mounting system for such a dust bag.

SUMMARY OF THE INVENTION

The present invention provides a novel and improved disposable dust bag for vacuum cleaners and the like. The dust bag provides a low cost structure which is easily mounted and removed and which reliably provides a strong connection and a reliable seal with a connector. The present invention further provides a vacuum cleaner and mounting system for such a bag.

The disposable vacuum cleaner dust bag of the present invention comprises a porous sheet defining a dust collection chamber having an inlet, and a substantially rigid collar secured to the sheet around the inlet. The collar provides an opening and has at least a pair of peripherally spaced, radially pivotable portions disposed about the opening and extending radially inwardly further than the remainder of the collar when the pivotable portions and the collar remainder are in the same plane. An elastic diaphragm on the collar provides an opening smaller than the opening in the collar, the collar being adapted to be mounted on a connector having an outlet having an end through which the air is delivered by a vacuum cleaner and which provides peripherally spaced outwardly extending projections. The collar is adapted to be installed, maintained in an installed position, and removed with the pivotable portions aligned with the projections. In the installed position the collar, the diaphragm and the pivotable portions are adapted to extend past the projections at the side thereof remote from the end, with the pivotal portions at least indirectly engaging the sides of the projections remote from the end at an angle to releasably secure the collar on the connector in the installed position. The diaphragm is adapted to extend into engagement with the surface of the connector on the sides of the projections both remote from the end and adjacent the end to provide an airtight seal with the connector when the collar is in the installed position.

In a preferred embodiment of the dust bag the diaphragm is adapted to stretch over the projections and to engage the connector when the collar is in the installed position, thereby to form a seal with the connector preventing the diaphragm from blowing through the collar when exposed to air pressure. In the installed position, the diaphragm biases the pivotable portions towards the projections at an angle. The pivotable portions are forcibly bendable during movement of the collar out of the installed position.

The vacuum cleaner of the present invention comprises a connector through which the air is discharged, the connector providing a wall portion having an end and peripherally spaced outwardly extending projections substantially adjacent to the end. The disposable dust bag includes a dust collection chamber formed of a permeable sheet material defining an inlet in the dust bag, and a substantially rigid collar around the inlet and having an opening therein proportioned to fit over the connector and the projections when the collar is being mounted on the connector. An elastomeric seal around the inlet provides an opening, the seal extending adjacent the sides of the projections both remote from the end and adjacent the end. The seal forms an airtight sealing engagement with the surface of the connector so that the seal forms an airtight seal between the dust bag and the connector when the collar is in an installed position on the connector. The improvement in the bag resides in the collar further defining peripherally spaced pivotable portions disposed about the opening and having free ends disposed radially inwardly further than the remainder of the collar when the pivotable portions and the collar remainder are in the same plane. When the collar is in the installed position the free ends at least indirectly engage the sides of the projections remote from the end at an angle and resist movement of the collar relative to the connector out of the installed position. The pivotable portions are aligned with the projections both in the installed position and during mounting.

In a preferred embodiment of the vacuum cleaner, the pivotable portions pivot toward the end during mounting of the collar on the connector to enable the collar to clear the projections. In the installed position the diaphragm biases the pivotable portions towards the projections at an angle, and the pivotable portions project toward the projections at an angle of about 45°. The pivotable portions are forcibly deformable during movement of the collar out of the installed position. There are at least two of the projections equidistantly spaced from the end of the connector and at least two of the pivotable portions on the collar.

Preferably, the seal is a thin diaphragm mounted on the collar and extending radially inwardly into the opening in the collar, the diaphragm forming an airtight seal with the connector when the collar is in the installed position. The diaphragm provides an opening slightly smaller than the end of the connector and engages at least a portion of the end of the connector.

The disposable vacuum cleaner dust bag mounting system of the present invention comprises a flexible body of air-permeable sheet material defining a dust collection chamber having an inlet, and a connector providing an annular wall surrounding a passage and having an end adapted to be connected to a vacuum cleaner through which the air is delivered to the chamber. The annular wall is provided with peripherally spaced projections providing radially extending rearwardly facing surfaces. The bag providing mounting means surrounding the inlet includes an elastomeric diaphragm and a substantially rigid collar. The collar has an opening therein and pivotable portions disposed about the opening and aligned with the projections. The pivotable portions extend radially inwardly further than the remainder of the collar when the pivotable portions and the collar remainder are in the same plane. The pivotable portions are sized to indirectly engage the rearwardly facing surfaces at an angle when the bag is in a mounted position on the connector, to clear the projections by pivoting during mounting of the collar on the connector, and to bend during forcible removal of the collar from the connector, thereby allowing movement of the collar past the projections. The diaphragm provides an opening therein aligned with the end of the connector and is sized to be stretched past the projections from the sides thereof adjacent the end to the sides of the projections remote from the end and into airtight sealing engagement with the annular wall on the side of the projections remote from the end, the diaphragm engaging the annular wall and biasing the pivotable portions into indirect engagement with the rearwardly facing surfaces.

In a preferred embodiment of the mounting-system, the projections extend outwardly from the annular wall, the opening in the collar being sized to closely fit around the wall between the pivotable portions. The projections tilt rearwardly towards the projections, and the collar is formed of substantially rigid but forcibly deformable material.

The diaphragm provides an opening slightly smaller than the wall, the diaphragm stretching over the projections to provide a lip seal with the connector. Preferably the chamber is an elongated vertically extending chamber having ends, and the collar is spaced from the ends of the chamber.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 1 is a schematic illustration of a vacuum cleaner with a disposable dust bag incorporating this invention installed thereon, portions of the cloth dust bag being cut away to reveal details of internal construction;

FIG. 3 is a rear elevational view of the collar and diaphragm of the bag, with the remainder of the bag fragmentarily shown in phantom line;

FIGS. 5–7 are horizontal sectional views illustrating the connector and the dust bag in the unmounted, fully mounted and partially removed positions, respectively.

DETAILED DESCRIPTION OF THE PREFERRED EMBODIMENTS

Figure 2:
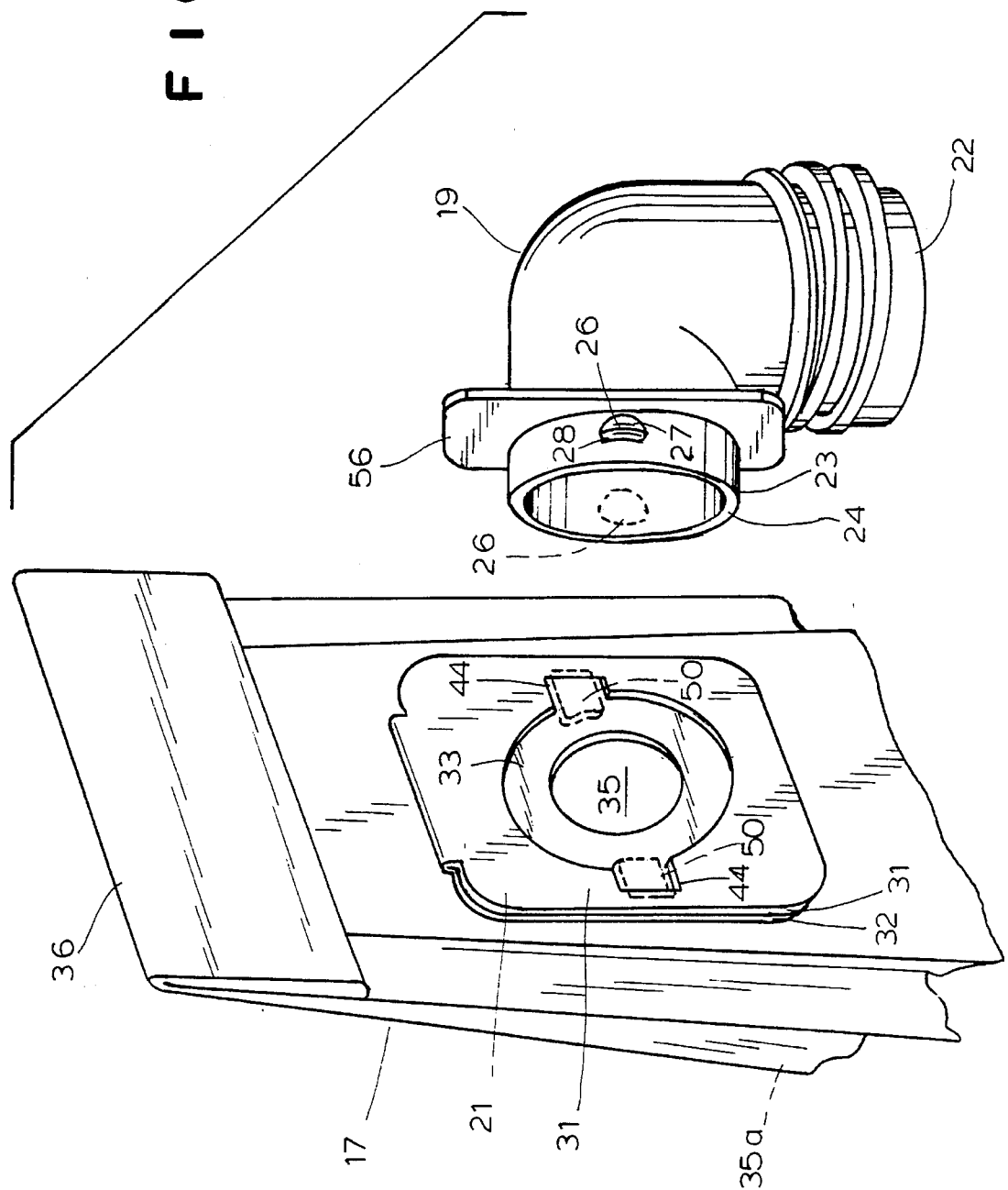
FIG. 2 is a fragmentary perspective view illustrating the vacuum cleaner connector and the dust bag prior to the mounting of the dust bag.

Referring now to the drawing, and in particular to FIG. 1 thereof, therein schematically illustrated is a disposable dust bag and mounting system incorporating the present invention, as applied to a typical upright vacuum cleaner generally designated by the reference numeral 10. The vacuum cleaner 10 includes a motor and fan housing assembly 11. Such cleaners are particularly adapted for carpet and rug cleaning, and in many instances can be provided with various types of attachments for other types of cleaning operations.

In the illustrated embodiment, the dirt-laden air is discharged by the fan through a flexible hose 12 which extends upwardly from the housing assembly 11 within a cloth dust bag 13, although a non-flexible hose may be used. The cloth dust bag 13 is connected below (at 14) to the housing assembly 11, and is supported at its upper end from the handle 16 of the vacuum cleaner. A disposable dust bag incorporating the present invention, generally designated 17, is present in an installed or mounted position within the cloth dust bag 13 during use. Normally, the cloth dust bag 13 is provided with a zipper 18 or like openable closure which can be opened to provide access for the mounting and removal of the disposable dust bag 17.

Mounted on the upper end of the flexible hose 12 is a connector, generally designated 19, which is connected to the disposable dust bag 17, as described in greater detail below, and through which the dirt-laden air passes into the disposable dust bag 17. The disposable dust bag 17 is provided with a mounting collar 21 which is removably mounted to the connector 19 so that all of the air from the cleaner enters the dust bag 17 where the dirt is collected.

The overall structure of the connector 19 and the mounting collar 21 of the disposable dust bag 17 is best illustrated in FIG. 2. The connector 19 in the illustrated embodiment is a rigid molded plastic part providing a generally cylindrical inlet 22 connected by suitable means to the flexible hose 12. The dirt-laden air enters the connector 19 through the inlet 22 of the connector 19 and is discharged through a generally cylindrical front outlet portion 23, which in the illustrated embodiment extends at a right angle to the inlet 22.

Substantially adjacent to the end 24 of the outlet portion 23, the connector 19 is provided with a pair of preferably equidistantly spaced peripheral mounting projections 26 which cooperate with the collar 21 to securely mount the dust bag 17 on the connector 19. As best illustrated in FIGS. 5–7, preferably the rearward walls 27 of the projections extend radially and the forward walls 28 are inclined rearwardly.

Figure 4:
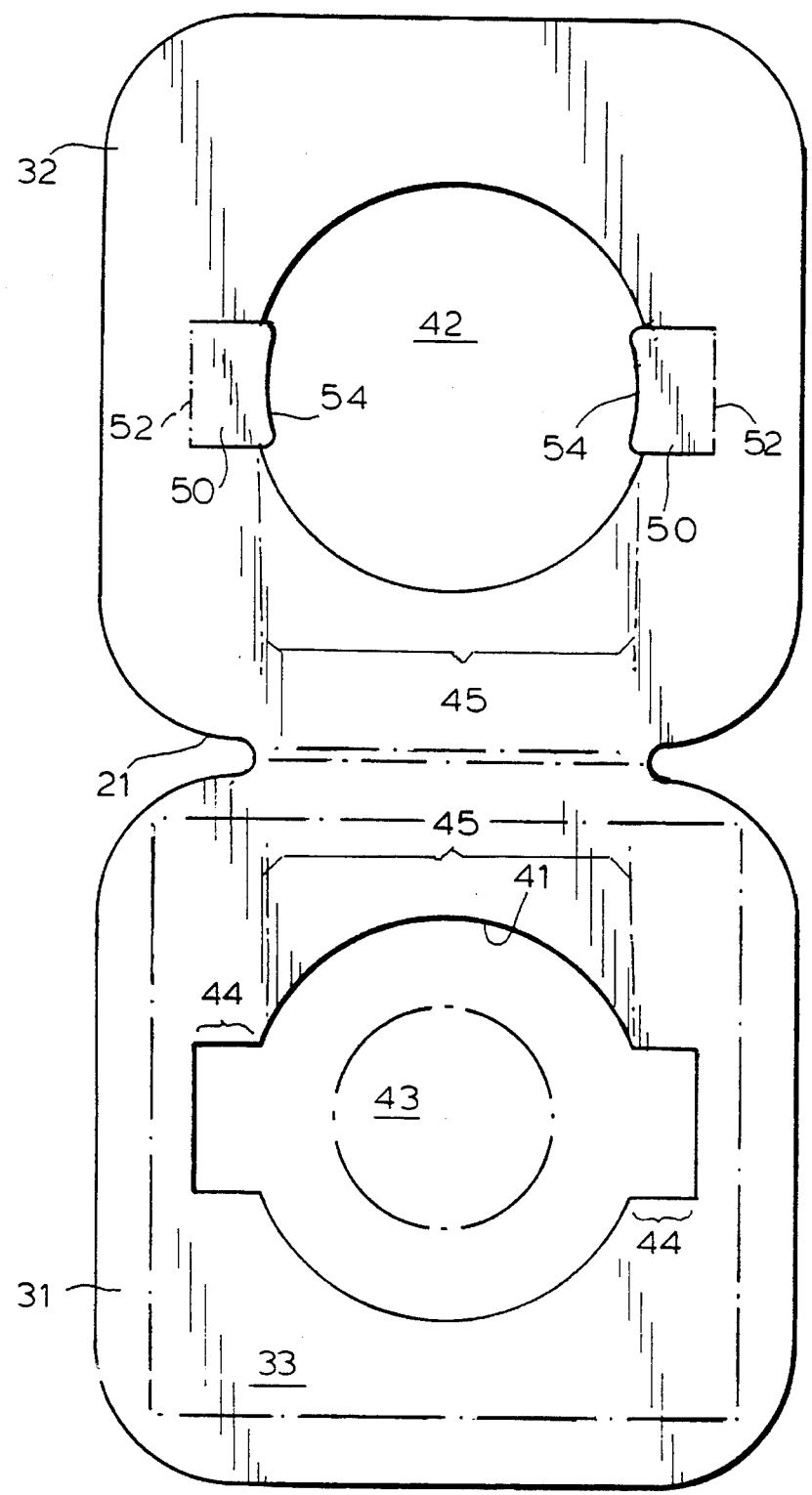
FIG. 4 is a plan view of an opened-up collar.

Referring now to FIG. 4 in particular, the mounting collar 21 in the illustrated embodiment includes two layers 31 and 32 of stiff, substantially rigid cardboard, which are laminated with adhesive (not shown) to opposite sides of an elastomeric diaphragm 33 (illustrated in phantom line). The layer of cardboard 31 is also adhesively secured to the wall 34 of the disposable dust bag around the inlet 35 therein (see FIG. 2). The dust bag 17 is preferably formed of an air-permeable paper material of the general type used in the past to form disposable dust bags for vacuum cleaners and the like, and is folded and seamed to define an elongated bag structure which defines a chamber 35a in which the dirt is collected.

Preferably the mounting collar 21 is located at a location spaced from both the upper end 36 and the lower end 37 of the dust bag 17. In use, the air enters the bag from the connector 19 through the inlet 35, and the material forming the bag allows the air to pass out through the disposable dust bag 17 and the cloth dust bag 13 to the environment while preventing the passage of the particles of dirt entrained within the air. Such dirt tends to collect in the lower part 37 of the disposable dust bag 17 and, because the inlet 35 is spaced from the upper end 36 of the bag IV, the upper portion of the bag remains relatively clear of collected dirt so that substantially free passage of the air occurs from the dust bag. In normal use, the dust bag is removed and discarded along with the dirt collected therein when the level of the dirt approaches the level of the inlet 35 of the mounting collar 21. By providing the inlet 35 at a location below the upper end 36 of the dust bag, the tendency for back pressure to be built up during the use of the cleaner is minimized and the efficiency of the cleaner is maintained until the bag is substantially filled to the level of the inlet 35 provided by the collar 21.

Referring to FIGS. 2 and 4, the two layers 31 and 32 of the mounting collar 21 are formed with generally equal sized openings 41 and 42, respectively, therein and the diaphragm 33 is formed with a circular opening 43 which is substantially smaller than the openings 41, 42 in the two collar layers 31 and 32. The opening 41 in the front collar layer 31 (referred to herein as the "front" layer because it is the first of the two collar layers 31 and 32 to be mounted onto the connector 19) is circular, except for two radially extending, enlarged cut-out portions 44, which are sized and positioned to clear the projections 25 when the collar 21 is being installed on and removed from the connector 19.

The opening 42 in the back layer 32 is also circular, except for two radially extending, pivotable portions 50. Each pivotable portion 50 is cut out of the back collar-layer 32 on both sides and has a connected end 52 which is secured to the layer 32 by a foldline or like line of weakness (thereby enabling pivoting of the portion 50 relative to the back collar layer 32 and hence the plane of the remainder of the collar 21) and a free end 54 which extends slightly into the opening 42. The projections 50 are sized and positioned to pivot slightly towards connector end 24 and thereby clear the projections 26 while the collar 21 is being mounted on the connector 19. The pivotable portion 50 never actually contacts the projection 26 itself, but rather is acted upon by the intermediate diaphragm 33.

In the illustrated embodiment, the projections 26 are located on the sides of the outlet portion 23 of the connector 19 and the enlarged portions 44 and pivotable portions 50 are located along the horizontal axis (width) of the bag. During mounting, installation and removal of the disposable bag 17, the collar 21 is oriented in a position in which the two enlarged portions 44 and pivotable portion 50 are aligned with the mounting projections 26, as best illustrated in FIGS. 5–7. This is the mounting and removal position of the collar 21 with respect to the connector 19, as well as the installed position.

During mounting, the collar 21 is moved from the position illustrated in FIG. 5 toward the connector, as illustrated in FIG. 6. In this position, the diaphragm 33 engages the end 24 of the connector 19, and the circular portions 45 of the opening 41 and 42 in the two collar layers 31 and 32 align with and closely fit the exterior surface of the outlet portion 23 of the connector. Both circular portions 45 of the mounting collar 21 are positioned behind the two projections 26. Further, the projections 26 are aligned with the enlarged portions 44 and pivotable portions 50.

As best illustrated in FIG. 6, the diaphragm opening 43 is slightly smaller than the end of the connector 19 so that, as the mounting collar 21 is pressed over the end 24 of the connector 19 and around and along the exterior wall of the outlet portion 23 in the mounting direction of arrow 70, the diaphragm 33 is stretched to the illustrated position, in which the diaphragm extends outwardly and rearwardly along the forward side 28 of each projection 26 and inwardly along the rearward side 28 of each projection 26. In the illustrated embodiment, both projections 26 are equally spaced back from the end 24 of the connector 19. Consequently, the collar 21 in its mounted or installed position is generally parallel with respect to a plane perpendicular to the outlet portion 23.

The engagement between the diaphragm 33 and the exterior wall of the connector 19 provides a seal which ensures that a fluid-tight joint is provided between the disposable dust bag 17 and the connector 19. This ensures that all of the air passes into the disposable dust bag 17 and that no leakage occurs. By sizing the unstretched opening 43 in the diaphragm 33 slightly smaller than the end 24 of the connector, it is ensured that the diaphragm 33 maintains this seal and does not blow through and invert during operation of the cleaner. Further, the diaphragm 33 provides a very snug mechanical contact with the connector 19 which frictionally maintains the dust bag in its mounted position during the use of the cleaner. Optionally, the diaphragm 33 may extend radially inwardly a small distance on and possibly even beyond the end 24 of the connector outlet portion 23 to define a lip seal therewith.

Mounting of the collar 21 on the connector 19 results in the pivotable portions 50 becoming inclined towards the connector end 24 (as illustrated in FIG. 6). In this position, the stiffness of the pivotable portions 50, supplemented by the biasing of the diaphragm 33 thereagainst, acts to preclude movement of the collar 21 towards connector end 24 as the free ends 54 of the pivotable portions 50 abut (through the diaphragm 33) the rearward wall 27 of the projection 26. The resistance exerted by the projections 50 to removal of the collar 21 from the connector 19 is more than sufficient to overcome the relatively minor forces normally tending to displace the collar 21 from the connector 19—namely, the pressure of the air exiting end 24 of outlet 23 and impacting upon the opposed interior surface of the dust bag 17.

An outwardly extending flange 56 is disposed behind the projections 26 on the outlet 23 and serves to limit insertion of the collar 21 on the connector 19 by providing a stop abutment for the front collar layer 31. Thus, the front surface of the front collar layer 31 typically abuts the front surface of the outlet flange 56, while the pivotable portions 50 are inclined towards and abut (via diaphragm 33) the rearward wall 27 of the projection 26.

The extent to which the pivotable portion free ends 54 initially extend into the central aperture 44, and the spacing between the rearward wall 27 of the projecting portions 26 and the front of flanges 56 are selected to ensure that, when the collar 21 is installed on the connector 19, the pivotable portions 50 are disposed at the best angle (typically 45°) for resisting removal of the collar 21 from the connector 19.

As illustrated in FIG. 7, when the level of dirt collected in the disposable dust bag 17 reaches substantially to the level of the inlet 35 provided by the mounting collar 21, the dust bag 17 is moved in the opposite direction (i.e., in the removal direction of arrow 72), the enlarged portions 43 and 44 still being in alignment with the associated projections 26, and the dust bag 17 is easily forcibly removed from the connector 19 for disposal. Subsequently, a new, empty disposable dust bag is installed and cleaning operations can be continued.

The force required during the removal process is the sum of the force required to roll diaphragm 33 over the projection 26 and off of the outlet end 24 and the force required to at least temporarily deform the pivotable portion 50. As is well known, cardboard is typically substantially stiff until the force applied thereto exceeds a particular level, and thereafter the cardboard deforms or bends easily. Since the rigidity of the pivotable portions 50 is substantially weakened by the removal process, it is generally not desirable to remove the disposable dust bag 17 until it is ready to be discarded.

It will be appreciated that both the mounting and removal of the mounting collar 21 from the cleaner connector 19 involves only a motion along a linear axis, in one direction or the opposite direction. Locking of the collar on a connector occurs automatically as the pivotal portions 50 assume an inclined orientation, and such locking remains in place until it is forcibly overcome during the removal process. Optionally, the exposed face of the collar 21 is provided with printed indicia to indicate the proper position for the mounting of the dust bag on the collar and for its removal, although the same is quite clear in any case from the placement of the enlarged cut-out portions 44.

Clearly the principles of the present invention are applicable to other types of vacuum cleaners as well, including floor or cannister models. Furthermore, while the present invention is illustrated in connection with a vacuum cleaner having a cloth dust bag 13 disposed about the disposable dust bag 17, the principles of the present invention are applicable to vacuum cleaners without a cloth dust bag. Similarly, while the projections 26 are preferably located on the sides of the outlet portion 23 of the connector 19 and the enlarged portions 44 and the pivotable portions 50 are located along the horizontal axis (width) of the collar 21, this arrangement may be varied with the projections 26, enlarged portions 44 and pivotal portions 50 being, for example, aligned on a vertical axis. Indeed, while only two projections 26, two enlarged portions 44 and two pivotal portions 50 are illustrated, a greater number of each may be employed, for example, where more secure attachment of the mounting collar 21 to the connector 19 might be needed—e.g., when the dirt-laden air was expected to impact upon the dust bag 17 with an unusually high pressure.

While the dust bag of the present invention is intended for use with a connector 19 having projections 26 as illustrated, it may also be used with existing connector structures such as those illustrated in the aforementioned U.S. Pat. No. 4,877,432. While the projections 26 illustrated therein are non-equidistantly spaced from the connector end 24, so that the collar is non-vertical in its installed position, the mounting collar 21 of the present invention may also be used with such a structure. In this instance, the mounting collar 21 of the present invention would also be offset from the vertical, but this would not seriously deleteriously affect the seal between the mounting collar 21 and the connector 19.

With the present invention, a low-cost, reliable structure is provided which can be easily installed and removed by the user, and which ensures that a good seal is provided between the dust bag and the connector.

The end 24 of outlet portion 23 of the connector 19 is designated the front end because it first encounters the collar 21 during the mounting process, while the layer 31 of collar 21 is designated the front layer as it first encounters the end 24 of outlet portion 23 of connector 19 during the mounting process.

While the present invention has been illustrated and described hereinabove in terms of the collar 21 having a diaphragm 33 with a generally circular opening 43 and a connector 19 having a generally cylindrical outlet portion 23 on which the collar 21 is mounted, the opening 43 need not be generally circular and the outlet portion 23 need not be generally cylindrical. While these limitations are necessary in a system wherein the collar is to be rotated about the connector (as in the aforementioned U.S. Pat. No. 4,877,432), in the present invention there is no rotation of the collar relative to the connector and thus these limitations are unnecessary. Thus both opening 43 and outlet portion 23 may be polygonal without departing from the principles of the present invention. Similarly, the description of the connector providing an "annular" wall is not to be taken as implying that the wall is necessarily circular or cylindrical in configuration, but merely that it is a wall defining a passage therethrough and therefore has an interior surface and an exterior surface.

To summarize, the present invention provides a disposable dust bag for a vacuum cleaner which is installed on, maintained on, and removed from the connector without relative rotation of the connector or dust bag collar, and which automatically releasably locks in the installed position upon mounting on the connector, without any subsequent relative rotation or lateral movement of the dust bag collar relative to the connector. The dust bag is easily installed, provides a reliable seal, and is economical to produce and market. Finally, the present invention provides a vacuum cleaner and a mounting system for using such a dust bag.

Now that the preferred embodiments of the present invention have been shown and described in detail, various modifications and improvements thereof will become readily apparent to those skilled in the arts. Accordingly, the spirit and scope of the present invention is to be construed broadly and limited only by the appended claims, and not by the foregoing specification.

I claim:

1. In a vacuum cleaner comprising:

(A) a connector through which air is discharged, said connector providing a wall portion having an end and peripherally spaced outwardly extending projections substantially adjacent to said end; and (B) a disposable dust bag mounted on said connector including
  (i) a dust collection chamber formed of a permeable sheet material defining an inlet in said dust bag;
  (ii) a substantially rigid collar around said inlet and having an opening therein proportioned to fit over said connector and said projections when said collar is being mounted on said connector; and
  (iii) an elastomeric seal around said inlet providing an opening, said seal extending adjacent the sides of said projections both remote from said end and adjacent said end, said seal forming an airtight sealing engagement with the surface of said connector so that said seal forms an airtight seal between said dust bag and said connector when said collar is in an installed position on said connector;
  the improvement wherein said collar further defines peripherally spaced pivotable portions disposed about said opening and having free ends disposed radially inwardly further than the remainder of said collar when said pivotable portions and said collar remainder are in the same plane, when said collar is in said installed position said free ends at least indirectly engaging the sides of said projections remote from said end at an angle and resisting movement of said collar relative to said connector out of said installed position, said pivotable portions being aligned with said projections both in said installed position and during mounting.

2. A vacuum cleaner as set forth in claim 1, wherein said pivotable portions pivot toward said end during mounting of said collar on said connector to enable said collar to clear said projections.

3. A vacuum cleaner as set forth in claim 2, wherein in said installed position said pivotable portions project toward said projections at an angle of about 45°.

4. A vacuum cleaner as set forth in claim 1, wherein said seal is a thin diaphragm mounted on said collar and extending radially inwardly into said opening in said collar, said diaphragm forming an airtight seal with said connector when said collar is in said installed position.

5. A vacuum cleaner as set forth in claim 4, wherein said diaphragm provides an opening slightly smaller than said end of said connector.

6. A vacuum cleaner as set forth in claim 5, wherein, in said installed position, said diaphragm biases said pivotable portions towards said projections at an angle.

7. A vacuum cleaner as set forth in claim 1, wherein said pivotable portions are forcibly deformable during movement of said collar out of said installed position.

8. A vacuum cleaner as set forth in claim 1, wherein there are at least two of said projections equidistantly spaced from said end of said connector and at least two of said pivotable portions on said collar.

9. In a vacuum cleaner comprising:

(A) a connector through which air is discharged, said connector providing a wall portion having an end and at least a pair of peripherally spaced outwardly extending projections substantially adjacent to said end; and (B) a disposable dust bag mounted on said connector including
  (i) a dust collection chamber formed of a permeable sheet material defining an inlet in said dust bag;
  (ii) a substantially rigid collar around said inlet and having an opening therein proportioned to fit over said connector and said projections when said collar is being mounted on said connector; and
  (iii) an elastomeric seal around said inlet providing an opening, said seal extending adjacent the sides of said projections both remote from said end and adjacent said end, said seal forming an airtight sealing engagement with the surface of said connector so that said seal forms an airtight seal between said dust bag and said connector when said collar is in an installed position on said connector, said seal being a thin diaphragm mounted on said collar, extending radially inwardly into said opening in said collar, and forming a lip seal with said connector when said collar is in said installed position, said diaphragm providing an opening slightly smaller than said end of said connector;
  the improvement wherein said collar further defines at least a pair of peripherally spaced pivotable portions disposed about said opening and having free ends disposed radially inwardly further than the remainder of said collar when said pivotable portions and said collar remainder are in the same plane, said pivotable portions pivoting toward said end during mounting of said collar on said connector to enable said collar to clear said projections, when said collar is in said installed position said free ends at least indirectly engaging the sides of said projections remote from said end at about a 45° angle and resisting movement of said collar relative to said connector out of said installed position, said diaphragm biasing said pivotable portions towards said projections at an angle, said pivotable portions being aligned with said projections both in said installed position and during mounting, said pivotable portions being forcibly deformable during movement of said collar out of said installed position.

10. A disposable vacuum cleaner dust bag mounting system comprising:

(A) a porous sheet defining a dust collection chamber having an inlet;

(B) a connector having an outlet having an end through which the air is delivered by a vacuum cleaner and which provides only a pair of peripherally spaced outwardly extending projections; and (C) a substantially rigid collar secured to said sheet around said inlet, said collar providing an opening and having only a pair of peripherally spaced radially pivotable portions disposed about said opening and extending radially inwardly further than the remainder of said collar when said pivotable portions and said collar remainder are in the same plane, an elastic diaphragm on said collar providing an opening smaller than said opening in said collar, said collar being adapted to be mounted on said connector, said collar being installed, maintained in an installed position, and removed with said pivotable portions aligned with said projections, in said installed position said collar, said diaphragm and said pivotable portions extending past said projections at the side thereof remote from said end with said pivotal portions at least indirectly engaging the sides of said projections remote from said end at an angle to releasably secure said collar on said connector in said installed position, said diaphragm extending into engagement with the surface of said connector on the sides of said projections both remote from said end and adjacent said end to provide an airtight seal with said connector when said collar is in said installed position.

11. A system as set forth in claim 10, wherein said diaphragm is stretched over said projections.

12. A system as set forth in claim 11, wherein said diaphragm engages said connector when said collar is in said installed position to form a seal with said connector preventing said diaphragm from blowing through said collar when exposed to air pressure.

13. A system as set forth in claim 12, wherein, in said installed position, said diaphragm biases said pivotable portions towards said projections at an angle.

14. A system as set forth in claim 10, wherein said pivotable portions are forcibly bendable during movement of said collar out of said installed position.

15. A system comprising:
(A) a porous sheet defining a dust collection chamber having an inlet;
(B) a connector having an outlet having an end through which the dirt-laden air is delivered by a vacuum cleaner and which provides only a pair of peripherally spaced outwardly extending projections; and
(B) C a substantially rigid collar secured to said sheet around said inlet, said collar providing an opening and having only a pair of peripherally spaced radially pivotable portions disposed about said opening and extending radially inwardly further than the remainder of said collar when said pivotable portions and said collar remainder are in the same plane, an elastic diaphragm on said collar providing an opening smaller than said opening in said collar, said collar being adapted to mount on said connector, said collar being installed, maintained in an installed position, and removed with said pivotable portions aligned with said projections, in said installed position said collar, said diaphragm and said pivotable portions extending past said projections at the side thereof remote from said end with said pivotal portions at least indirectly engaging the sides of said projections remote from said end at an angle to releasably secure said collar on said connector in said installed position, said pivotable portions being forcibly bendable during movement of said collar out of said installed positions, said diaphragm being adapted to engage said connector and stretch over said projections and to extend into engagement with the surface of said connector on the sides of said projections both remote from said end and adjacent said end to provide an airtight seal with said connector when said collar is in said installed position, thereby to prevent said diaphragm from blowing through said collar when exposed to air pressure, and to bias said pivotable portions towards said projections at an angle.

16. A disposable vacuum cleaner dust bag mounting system comprising:
(A) a flexible body of air-permeable sheet material defining a dust collection chamber having an inlet; and
(B) a connector providing an annular wall surrounding a passage and having an end adapted to be connected to a vacuum cleaner through which the air is delivered to said chamber, said annular wall being provided with peripherally spaced projections providing radially extending rearwardly facing surfaces;
said bag providing mounting means surrounding said inlet including an elastomeric diaphragm and a substantially rigid collar, said collar having an opening therein and pivotable portions disposed about said opening and aligned with said projections, said pivotable portions extending radially inwardly further than the remainder of said collar when said pivotable portions and said collar remainder are in the same plane, said pivotable portions being sized to indirectly engage said rearwardly facing surfaces at an angle when said bag is in a mounted position on said connector, to clear said projections by pivoting during mounting of said collar on said connector, and to bend during forcible removal of said collar from said connector, thereby allowing movement of said collar past said projections, said diaphragm providing an opening therein aligned with said end of said connector and being sized to be stretched past said projections from the sides thereof adjacent said end to the sides of said projections remote from said end and into airtight sealing engagement with said annular wall on the side of said projections remote from said end, said diaphragm engaging said annular wall and biasing said pivotable portions into indirect engagement with said rearwardly facing surfaces.

17. A dust bag mounting system as set forth in claim 16, wherein said projections tilt rearwardly towards said projections.

18. A dust bag mounting system as set forth in claim 16, wherein said collar is formed of substantially rigid but forcibly deformable material.

19. A dust bag mounting system as set forth in claim 16, wherein said annular wall is a substantially cylindrical wall and said projections extend outwardly from said annular wall, said opening in said collar being generally circular between said pivotable portions and being sized to closely fit around said cylindrical wall between said pivotable portions.

20. A dust bag mounting system as set forth in claim 19, wherein said diaphragm provides an opening slightly smaller than said cylindrical wall, said diaphragm stretching over said projections to provide a seal with said connector.

21. A dust bag mounting system as set forth in claim 20, wherein said chamber is an elongated vertically extending chamber having ends, and said collar is spaced from said ends of said chamber.

22. A disposable vacuum cleaner dust bag mounting system comprising:
(A) a flexible body of air-permeable sheet material defining a dust collection chamber having an inlet; and
(B) a connector providing an annular wall surrounding a passage and having an end adapted to be connected to a vacuum cleaner through which the dirt-laden air is delivered to said chamber, said annular wall being provided with peripherally spaced projections providing radially outwardly extending rearwardly facing surfaces;
said bag providing mounting means surrounding said inlet including an elastomeric diaphragm and a substantially rigid but forcibly deformable collar, said collar having an opening therein and pivotable portions disposed about said opening and aligned with said projections, said opening in said collar being sized to closely fit around said annular wall between said pivotable portions, said pivotable portions extending radially inwardly further than the remainder of said collar when said pivotable portions and said collar remainder are in the same plane, said pivotable portions being sized to indirectly engage said rearwardly facing surfaces at an angle when said bag is in a mounted position on said connector, to clear said projections by pivoting during mounting of said collar on said connector, and to bend during forcible removal of said collar from said connector, thereby allowing movement of said collar past said projections, said diaphragm providing an opening therein aligned with said end of said connector and sized to be slightly smaller than said annular wall, said diaphragm being sized to be stretched over and past said projections from the sides thereof adjacent said end to the sides of said projections remote from said end and into airtight sealing engagement with said annular wall on the side of said projections remote from said end, said diaphragm engaging said annular wall to provide a seal with said connector, and biasing said pivotable portions into indirect engagement with said rearwardly facing surfaces.

* * * * *